(12) United States Patent
Pena

(10) Patent No.: US 7,890,397 B1
(45) Date of Patent: Feb. 15, 2011

(54) SYSTEM, METHOD, AND COMPUTER-READABLE MEDIUM FOR SETTLING ACCOUNTS

(75) Inventor: Crusita V. Pena, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 11/468,198

(22) Filed: Aug. 29, 2006

(51) Int. Cl.
*G06Q 40/00* (2006.01)

(52) U.S. Cl. ............................................. 705/35; 705/4

(58) Field of Classification Search .............. 705/35–42
See application file for complete search history.

(56) References Cited

U.S. PATENT DOCUMENTS

| | | | |
|---|---|---|---|
| 5,446,653 A * | 8/1995 | Miller et al. ................... | 705/4 |
| 5,752,236 A | 5/1998 | Sexton et al. | |
| 5,960,435 A * | 9/1999 | Rathmann et al. ........... | 707/101 |
| 6,041,304 A | 3/2000 | Meyer et al. | |
| 6,208,973 B1 | 3/2001 | Boyer et al. | |
| 6,330,541 B1 | 12/2001 | Meyer et al. | |
| 6,473,892 B1 * | 10/2002 | Porter ......................... | 717/106 |
| 6,606,740 B1 * | 8/2003 | Lynn et al. ................... | 717/100 |
| 6,970,836 B1 * | 11/2005 | Paltenghe et al. ............. | 705/18 |
| 6,999,935 B2 | 2/2006 | Parankirinathan | |
| 7,069,501 B2 * | 6/2006 | Kunitake et al. ............. | 715/234 |
| 7,451,097 B1 * | 11/2008 | Faupel et al. ................... | 705/4 |
| 2003/0158760 A1 | 8/2003 | Kannenberg | |
| 2003/0172168 A1 * | 9/2003 | Mak et al. ................... | 709/230 |
| 2003/0182290 A1 | 9/2003 | Parker | |
| 2004/0148201 A1 | 7/2004 | Smith et al. | |
| 2004/0153387 A1 * | 8/2004 | Mallozzi ...................... | 705/36 |
| 2004/0199446 A1 | 10/2004 | Lange | |
| 2005/0091195 A1 * | 4/2005 | Sarashetti ...................... | 707/3 |
| 2005/0187869 A1 | 8/2005 | Buerger | |
| 2005/0192849 A1 | 9/2005 | Spalding | |
| 2006/0031151 A1 | 2/2006 | Dorr | |
| 2006/0064313 A1 | 3/2006 | Steinbarth et al. | |
| 2006/0100913 A1 | 5/2006 | Ward | |
| 2006/0206415 A1 | 9/2006 | Ross | |
| 2006/0253478 A1 * | 11/2006 | Graham et al. .............. | 707/100 |

(Continued)

OTHER PUBLICATIONS

"Estate Planning- a matter of life & death", Douglas Goldstein. Jerusalem Post. Jerusalem: Apr. 26, 2002. p. 07.*

(Continued)

*Primary Examiner*—Ella Colbert
*Assistant Examiner*—Mohammad Z Shaikh
(74) *Attorney, Agent, or Firm*—Brooks, Cameron & Huebsch, PLLC

(57) ABSTRACT

A system, method, and computer-readable medium for settling accounts are provided. An aggregate policy document is generated from a plurality of document definitions that each respectively define a policy document. Mechanisms are provided that identify repetitive content that is common to a plurality of the documents definitions. A single instance of the repetitive content is included in the aggregate document. Content of the document definitions may include information sets having content to be reviewed by a beneficiary, and information request sets having content that provides a solicitation of information from the beneficiary. The aggregate document may contain content of a plurality of documents in a manner that allows the beneficiary to efficiently settle a plurality of accounts without the repetitive review of common document content and without the repetitive supply of common information.

14 Claims, 15 Drawing Sheets

U.S. PATENT DOCUMENTS

| | | |
|---|---|---|
| 2006/0265254 A1 | 11/2006 | Witkowski et al. |
| 2007/0061160 A1* | 3/2007 | Fisher .......................... 705/1 |
| 2007/0088635 A1* | 4/2007 | King .......................... 705/30 |
| 2008/0086314 A1* | 4/2008 | Fitzpatrick ..................... 705/1 |
| 2008/0091700 A1* | 4/2008 | Brotherson et al. ......... 707/102 |

OTHER PUBLICATIONS

"Executor of the will should settle debts", Jill Kerby. Sunday Times. London (UK): Apr. 11, 2004. p. 14.*

PDF Split Merge v2.1, http://www.verypdf.com/pdfpg/index.html.
A-PDF Merger, http://www.a-pdf.com/merger/index.htm.
http://www.cete.com/Products/DynamicPDFForNET/Merger.csp.
http://www.docucomp.com/products/docucomp_merge.htm.
PDF Page Organizer: Post Processor for Creating PDF files, http://www.foxitsoftware.com/pdf/po_intro.php.
http://www.gnu.org/software/diffutils/manual/html_node/Overview.html.
http://www.sobolsoft.com/jointext.

\* cited by examiner

700

| | 730a Member_ID | 730b Member_Name | 730c Policy1_ID | 730d Policy2_ID | ... | 730n PolicyX_ID |
|---|---|---|---|---|---|---|
| 720a | SS_A | Name_A | PolicyA | PolicyB | | PolicyC |
| 720b | SS_B | Name_B | PolicyA | PolicyC | | Null |
| 720c | SS_C | Name_C | PolicyB | Null | | Null |
| 720d | SS_D | Name_D | PolicyC | Null | | Null |
| 720e | SS_E | Name_E | PolicyA | PolicyC | | Null |
| ⋮ | ⋮ | ⋮ | ⋮ | ⋮ | | ⋮ |
| 720m | SS_M | Name_M | PolicyB | Null | | Null |

730 spans columns 730a–730n. 720 spans rows 720a–720m.

| | 780a Member_ID | 780b Member_Name | 780c Address | 780d Policy_ID | 780e Account_No | 780f Beneficiary | 780g Benef_Addr | 780h Benefit |
|---|---|---|---|---|---|---|---|---|
| 770a | SS_A | Name_A | Address1 | PolicyA | AccountNoA | BenefA_Name | BenefA_Addr | AmountA |
| 770b | SS_A | Name_A | Address1 | PolicyB | AccountNoB | BenefA_Name | BenefA_Addr | AmountB |
| 770c | SS_A | Name_A | Address1 | PolicyC | AccountNoC | BenefA_Name | BenefA_Addr | AmountC |
| 770d | SS_B | Name_B | Address2 | PolicyA | AccountNoD | BenefB_Name | BenefB_Addr | AmountD |
| 770e | SS_B | Name_B | Address2 | PolicyC | AccountNoE | BenefB_Name | BenefB_Addr | AmountE |

780 spans columns 780a–780h. 770 spans rows 770a–770e.

USAA FEDERAL SAVINGS BANK
10750 McDermott Freeway
San Antonio, TX 78288-0544

1221

1222 — IS_3 — Dear <<Beneficiary>>:  — 1211

1212

IS_4 — We are very sorry to hear of the death of << Member_Name >> , a valued customer of USAA.

1223 — Please accept our sympathy in your loss and our offer to be of any assistance we can. — 1213

IS_9 — The enclosed "Creditor's Claim" is customary when settling an estate and provides the information required to do so. This claim is not a request for payment in full. If you are not the person who is handling the Estate, we ask that you provide us with the name of the individual or institution that is handling the Estate, as well as their phone number and address. If we need to file a claim with the court, please advise us of that also.

Please acknowledge receipt of this Creditor's Claim by signing the bottom portion of this letter and returning it in the enclosed envelope. A copy of this letter and two copies of the Creditor's Claim are also enclosed for you to use in settling the Estate.

1224

IS_8 — Sincerely,

1214

USAA FEDERAL SAVINGS BANK

1225

1215

IS_10 — ACKNOWLEDGMENT OF RECEIPT OF CLAIM
USAA ACCOUNT #«AccountNumber»

1240 — The outstanding balance on this account is «CurrentBalance» — 1230

IRS_1

Signature _____ Date

Figure 12

1300 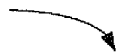

USAA FEDERAL SAVINGS BANK
10750 McDermott Freeway
San Antonio, TX 78288-0544

REFERENCE: USAA Credit Card Account <<Account No.>>

Dear <<Beneficiary>>:

We are very sorry to hear of the death of <<Member_Name>>, a valued customer of USAA. Please accept our sympathy in your loss and our offer to be of any assistance we can.

Please be advised that the above-referenced account has been closed to prevent any unauthorized activity. We, therefore, request that any credit cards and/or convenience checks be destroyed. The balance on the account is <<Benefit>>. However, if there are pending charges or credits, the balance will change when they post to the account.

If you are not the person who is handling the Estate, please forward the name, address and telephone number of the individual or institution handling the Estate to the following address:

USAA Federal Savings Bank
        Attn: Special Collections
        10750 McDermott Freeway
        San Antonio, TX 78288-0596

Should you have questions or if we may be of further assistance, please call 1-800-332-7391, extension 36012, Monday through Friday between 7:30 a.m. and 4:30 p.m., Central Standard Time. Thank you for your cooperation.

The enclosed "Creditor's Claim" is customary when settling an estate and provides the information required to do so. This claim is not a request for payment in full. If you are not the person who is handling the Estate, we ask that you provide us with the name of the individual or institution that is handling the Estate, as well as their phone number and address. If we need to file a claim with the court, please advise us of that also.

Please acknowledge receipt of this Creditor's Claim by signing the bottom portion of this letter and returning it in the enclosed envelope. A copy of this letter and two copies of the Creditor's Claim are also enclosed for you to use in settling the Estate. Should you have questions, or if we may be of assistance in any way, please call 1-800-

Figure 13A 1300 (cont.)

Sincerely,

USAA FEDERAL SAVINGS BANK

ACKNOWLEDGMENT OF RECEIPT OF CLAIM
USAA ACCOUNT #«AccountNumber»
The outstanding balance on this account is «CurrentBalance»

_____   _____
Signature                     Date

Figure 13B

SYSTEM, METHOD, AND COMPUTER-READABLE MEDIUM FOR SETTLING ACCOUNTS

CROSS REFERENCE TO RELATED APPLICATIONS

The present application is related to (1) U.S. Utility application Ser. No. 11/468,177, filed on Aug. 29, 2006, and (2) U.S. Utility application Ser. No. 11/468,190, filed on Aug. 29, 2006, the disclosures of which are incorporated herein by reference.

FIELD OF THE DISCLOSURE

Various embodiments of the disclosure pertain to a system, method, and computer-readable medium for settling or changing accounts and, more particularly, to a system, method, and computer-readable medium that facilitates settling or changing accounts in a manner that eases the burden of a survivor of a policy holder.

BACKGROUND

Dealing with survivorship is well-known and readily appreciated by those of skill in the art. Typically, a policy holder (referred to herein as a "member") may be a customer or otherwise have relationships with several different entities or agencies of a business such as, for example, a financial services company that may comprise various agencies, such as a property and casualty insurance agency, a life and health insurance agency, an investment services agency, a banking and credit services agency, a financial planning services agency, or other miscellaneous service entities. The various financial service agencies may comprise respective agencies, subsidiaries, or other divisions of a company, such as a financial services company, that provides an array of financial services. As referred to herein, an agency comprises an entity that provides a service and may issue an account (also referred to herein as a policy) to a member of the agency. A member may have one or more respective accounts, policies, or other relationships (collectively referred to herein simply as "accounts") with one or more of the agencies. In the event of the member's death, the member's accounts must be settled or closed. Settlement of the member's various accounts may require supply of various information and review of various documents by the member's beneficiary, e.g., the member's next-of-kin or other survivor designee (referred to herein simply as "beneficiary"). Upon the death of a member, the beneficiary must deal with a number of issues to close or resolve any number of accounts the deceased member, or decedent, held.

Upon death of the member, the accounts issued by several different agencies must be resolved. Typically, the beneficiary will receive many different, individualized correspondences from the agencies requesting guidance on how the accounts are to be resolved. This may result in the beneficiary being burdened with requisite reviews of large amounts of information and supply of information to the various agencies. Inasmuch as the various agencies may process accounts independently from other agencies, the beneficiary may receive duplicative information from various agencies and may likewise receive requests for duplicative information from various agencies. Additionally, the beneficiary is typically required to provide a signature to resolve each account. Moreover, the survivor may be required to interact with various personnel, or points of contact, that represent the various agencies with which the decedent held accounts. Resolution of the various accounts is typically burdensome, particularly considering the beneficiary may be distressed from the recent death of a family member or loved-one.

Such conventional methods of dealing with survivorship results in a burdensome and inefficient process for the survivor. Accordingly, it would be desirable to provide mechanisms for easing the burden of a survivor absent the disadvantages discussed above.

SUMMARY

Various embodiments of the present disclosure are directed to systems, methods and instructions for settling accounts. The systems and methods provide techniques for reading, during an aggregation cycle, a first identifier associated with a first information set, and determining whether the first identifier has previously been read during the aggregation cycle. The first information set is discarded after determining the first identifier has previously been read during the aggregation cycle.

BRIEF DESCRIPTION OF THE DRAWINGS

FIG. 7A is a diagrammatic representation of a table that associates members with policies in a manner that facilitates document aggregation in accordance with an embodiment;

FIG. 7B is a diagrammatic representation of a table that associates member's policies with beneficiary identifiers and benefits in accordance with an embodiment;

FIG. 12 depicts another document definition that defines a document in a manner that facilitates document aggregation in accordance with embodiments disclosed herein; and FIGS. 13A and 13B depict an aggregate document generated from aggregation of documents defined by the document definitions depicted in FIGS. 11 and 12 in accordance with an embodiment.

DETAILED DESCRIPTION

Figure 1:
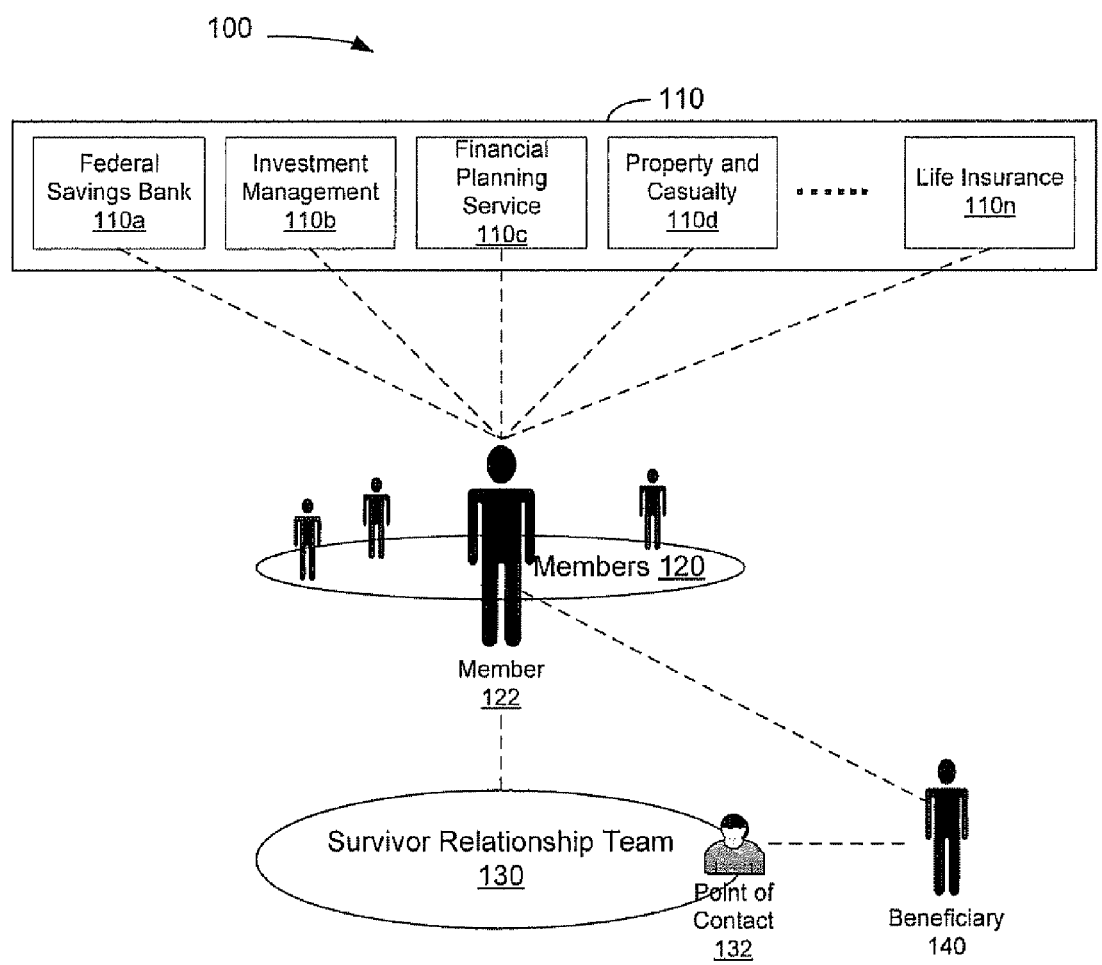
FIG. 1 an embodiment of a system that facilitates account settlement.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring now to FIG. 1, an embodiment of a system that facilitates account settlement is illustrated. System 100 may include a company 110 that provides one or more services to members 120. Company 110 may have one or more agencies, subsidiaries, or other divisions that provide respective services to members 120. In the present example, company 110 includes a federal saving bank agency 110a, an investment management agency 110b, a financial planning service agency 110c, a property and casualty agency 110d, and a life insurance agency 110n. Federal saving bank agency 110a may provide savings services to members. Investment management agency 110b may provide members with mutual funds and brokerage services. Financial planning service agency 110c may provide members with financial planning services and advice. Property and casualty agency 110d may provide members with, for example, automobile insurance, burglary insurance, fire insurance, liability insurance, and other miscellaneous insurance services. Life insurance agency 110n may provide term, whole life, variable universal life, or other insurance policies to members. Various other services may be offered by company 110 in addition to or in lieu of those depicted and described. The particular agencies and services thereof are provided only to facilitate an understand of embodiments disclosed herein.

Each of members 120 may have a relationship, e.g., a policy, account, or other service relationship, with one or more of agencies 110a-110n. In the illustrative example, a member 122 has a respective relationship (illustratively designated with dashed lines) with each of agencies 110a-110n. A survivor relationship team 130 may comprise personnel employed by company 110 that facilitates account settlement in the event of the death of a member. To this end, a particular employee included in survivor relationship team 130 may be assigned as a point of contact (POC) for facilitating account settlement between a decedent's survivor and the one or more agencies with which the decedent holds accounts. In the illustrative example, member 122 has a beneficiary 140 appointed for account settlement in the event that member 122 dies, and POC personnel 132 is designated to facilitate account settlement by beneficiary 140. While a single beneficiary 140 is depicted as designated or otherwise associated with member 122, a plurality of beneficiaries may be associated with member 122.

Figure 2:
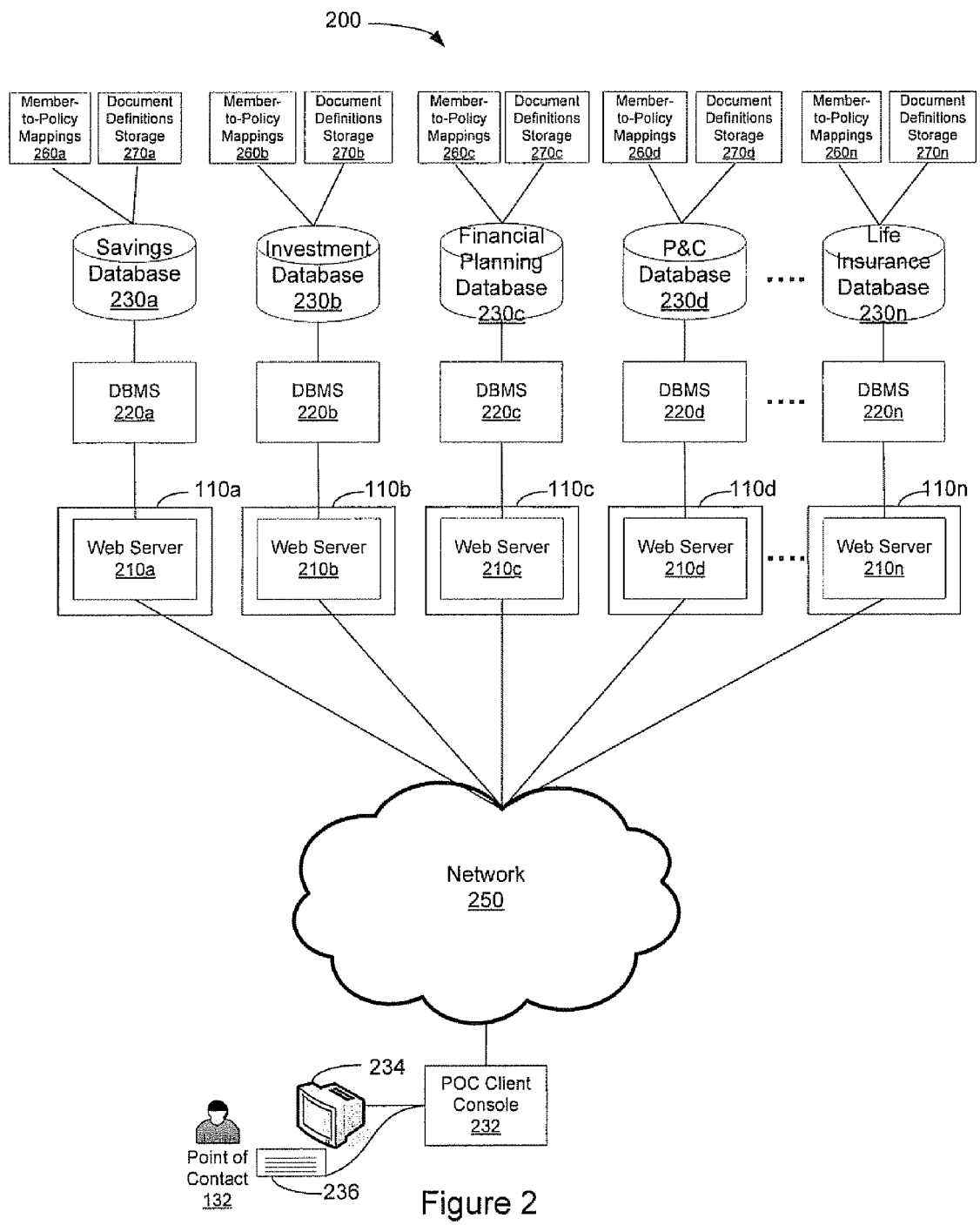
FIG. 2 is a diagrammatic representation of a communication system that may facilitate account settlement mechanisms deployed in accordance with embodiments disclosed herein.

FIG. 2 is a diagrammatic representation of a communication system 200 that may facilitate account settlement mechanisms deployed in accordance with embodiments disclosed herein. Communication system 200 may comprise a network of computers and networking equipment. In the illustrative example, system 200 include a network 250, which is the medium used to provide communication links between various devices and computers connected together within system 200. Network 250 may include connections, such as wire, wireless communication links, or fiber optic cables.

In the depicted example, each of agencies 110a-110n are communicatively coupled to or within network 250 via respective servers 210a-210n. Servers 210a-210n may be implemented as, for example, web servers, and thus network 250 may be implemented as the Internet. In the depicted example, web servers 210a-210n may be respectively implemented as an HTTP server that sends web pages to clients, such as a point of contact (POC) console 232, responsive to receiving an HTTP request from, for example, a browser or other application running on console 232. Additionally, servers 210a-210n may provide data other than HTTP data, such as applications, to console 232. Web servers 210a-210n may respectively interface and communicate with a respective database management systems (DBMSs) 220a-220n. DBMSs 220a-220n each may manage a respective database 230a-230n or other data structure. DBMSs 220a-220n may generally facilitate data organization, storage, and retrieval of data from databases 230a-230n. DBMSs 220a-220n may accept and process requests received from a respective web server 210a-210n. In one implementation, console 232 runs an aggregation application that retrieves document content related to a decedent account from one or more of databases 230a-230n and aggregates the content into a single aggregate document. In one implementation, each of databases 230a-230n store or interface with a respective member-to-policy mappings 260a-260n and one or more document definitions storage 270a-270n. A member-to-policy mapping may comprise a table or other data structure that maps or associates members to one or more policies in which the member is enrolled as described more fully hereinbelow with reference to FIGS. 7A and 7B. Each of document definitions storage 270a-270n comprises one or more document definitions that define documents associated with, or otherwise applicable to, a policy. In one embodiment, each document definition may include information sets and information request sets as described more fully hereinbelow with reference to FIGS. 6A-6B. POC personnel 132 may input a decedent information request or query, e.g., by way of a suitable input device 236 such as a keyboard. Console 232 may then issue a request for account information of a decedent on behalf of the decedent's beneficiary. The request may be submitted to one or more of servers 210a-210n that, in turn, relay the request to DBMSs 220a-220n where the request is processed and executed on databases 230a-230n. Data retrieved from databases 230a-230n, such as decedent policy enrollment information and a plurality of document definitions associated with policies to which the decedent is enrolled, may be returned by servers 220a-220n to console 232 via network 250. An aggregation application running on console 232 may then generate an aggregate document representative of a plurality of documents each defined by one of the document definitions. The aggregate document may then be output, e.g., on a display device 234, or otherwise processed by console 232.

System 200 may include additional servers, clients, and other devices not shown. In the depicted example, network 250 is the Internet representing a worldwide collection of networks and gateways that use the Transmission Control Protocol/Internet Protocol (TCP/IP) suite of protocols to communicate with one another. Of course, system 200 also may be implemented as a number of different types of networks, such as, for example, an intranet, a local area network (LAN), a wide area network (WAN), or any other suitable network configuration. FIG. 2 is intended as an example, and not as an architectural limitation, of a network system in which embodiments disclosed herein may be deployed.

Figure 3:
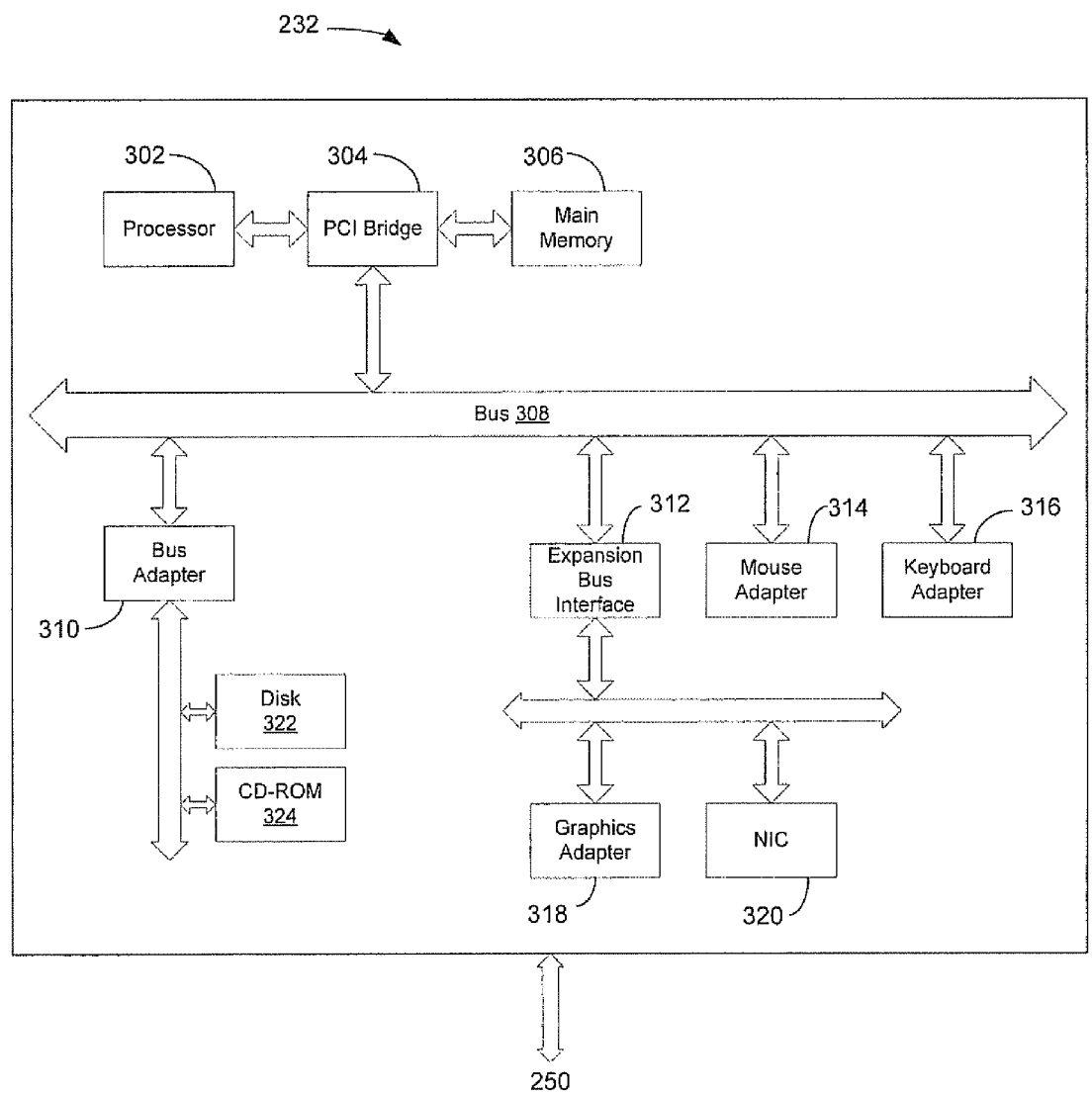
FIG. 3 is a diagrammatic representation of an exemplary embodiment of point of contact console depicted in FIG. 2.

FIG. 3 is a diagrammatic representation of an exemplary embodiment of point of contact console 232 depicted in FIG. 2. Code or instructions implementing embodiments of point of contact console processes disclosed herein may be located or accessed by console 232. In the illustrative example, console 232 employs a PCI local bus architecture, although other bus architectures, such as the Industry Standard Architecture (ISA), may be used. A processor system 302 and a main memory 306 are connected to a PCI local bus 308 through a PCI bridge 304. PCI bridge 304 also may include an integrated memory controller and cache memory for processor system 302. Additional connections to PCI local bus 308 may be made through direct component interconnection or through add-in connectors. In the depicted example, a small computer system interface (SCSI) host bus adapter 310, an expansion bus interface 312, a mouse adapter 314, and a keyboard adapter 316 are connected to PCI local bus 308 by direct component connection. In contrast, a graphics adapter 318 and a network interface card (NIC) 320 are connected to PCI local bus 308 via expansion bus interface 312 by add-in boards inserted into expansion slots. NIC 320 provides an interface for connecting console 232 with other devices in system 200, e.g., by way of a connection established with network 250, depicted in FIG. 2. Expansion bus interface 312 may provide a connection for various peripheral devices. SCSI host bus adapter 310 provides a connection for a hard disk drive 322 and a CD-ROM drive 324. Typical PCI local bus implementations may support a plurality of PCI expansion slots or add-in connectors.

An operating system runs on processor system 302 and is used to coordinate and provide control of various components within console 232. Instructions for the operating system and applications or programs are located on storage devices, such as hard disk drive 322, and may be loaded into main memory 306 for execution by processor system 302.

In accordance with embodiments disclosed herein, a point of contact personnel 132 may submit a request for account information related to a decedent by initiating a communication connection with one or more servers 210a-210n. To this end, console 232 may be configured as a client of one or more of servers 210a-210n. Communication connections between console 232 and servers 210a-210n may be made on the TCP/IP protocol suite, although other communication protocols may be suitably substituted therefor. Implementations of disclosed embodiments are not limited to any particular protocol and those described are provided only to facilitate an understanding of the disclosed embodiments.

Figure 4:
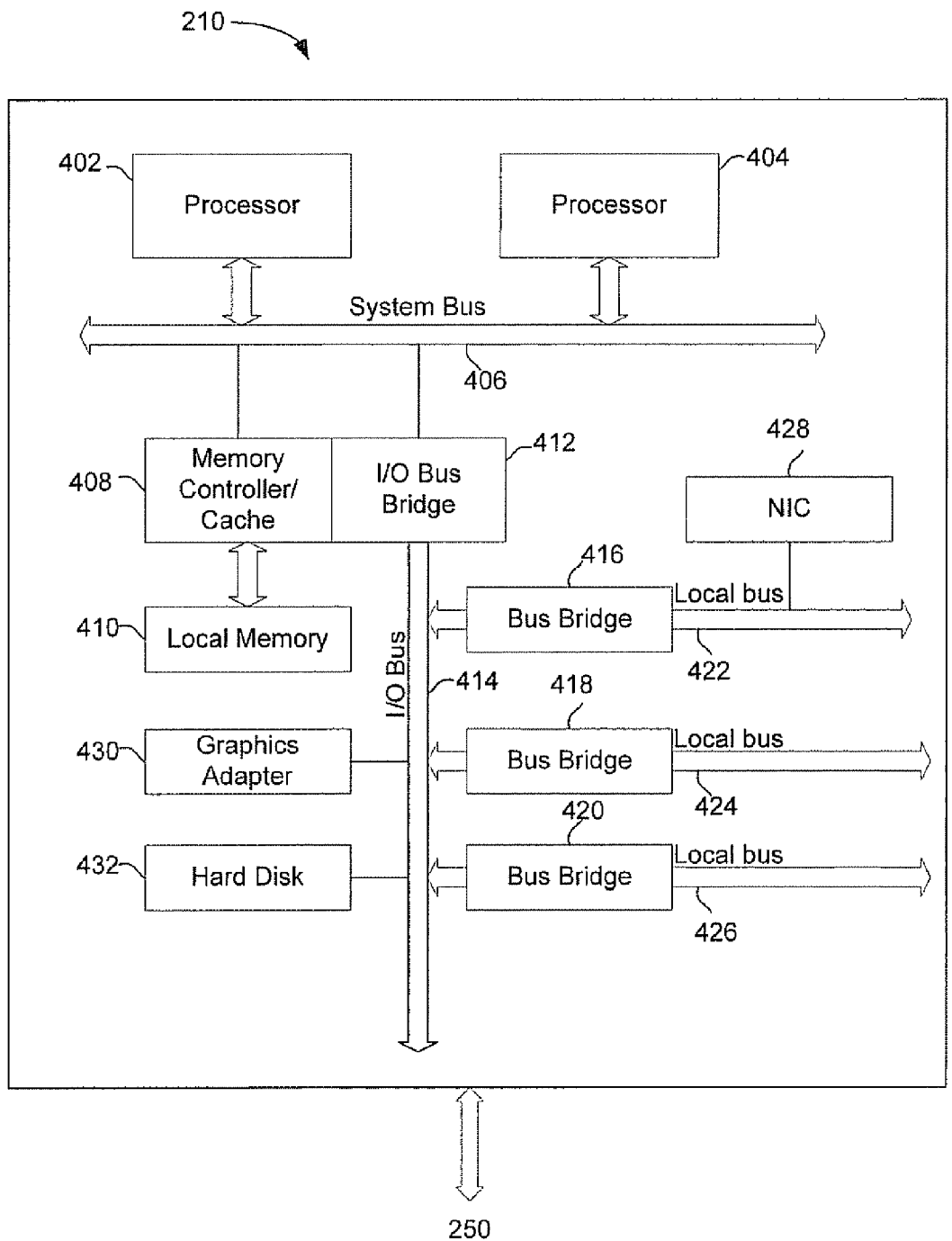
FIG. 4 is a diagrammatic representation of an exemplary server that may facilitate account settlement mechanisms deployed in accordance with embodiments disclosed herein.

FIG. 4 is a diagrammatic representation of an exemplary server 210 that may facilitate account settlement mechanisms deployed in accordance with embodiments disclosed herein. Server 210 is an example implementation of one or more of servers 210a-210n depicted in FIG. 2.

Server 210 may be a symmetric multiprocessor (SMP) system that includes a plurality of processors 402 and 404 connected to a system bus 406 although other single-processor or multi-processor configurations may be suitably substituted therefor. A memory controller/cache 408 that provides an interface to a local memory 410 may also be connected with system bus 406. An I/O bus bridge 412 may connect with system bus 406 and provide an interface to an I/O bus 414. Memory controller/cache 408 and I/O bus bridge 412 may be integrated into a common component.

A bus bridge 416, such as a Peripheral Component Interconnect (PCI) bus bridge, may connect with I/O bus 414 and provide an interface to a local bus 422, such as a PCI local bus. Communication links to other network nodes of system 200 in FIG. 2 may be provided through a network interface card (NIC) 428 connected to local bus 422 through add-in connectors. Additional bus bridges 418 and 420 may provide interfaces for additional local buses 424 and 426 from which peripheral or expansion devices may be supported. A graphics adapter 430 and hard disk 432 may also be connected to I/O bus 414 as depicted.

Those of ordinary skill in the art will appreciate that the hardware depicted in FIGS. 3 and 4 may vary. The depicted examples are not intended to imply architectural limitations with respect to implementations of the present disclosure.

Figure 5:
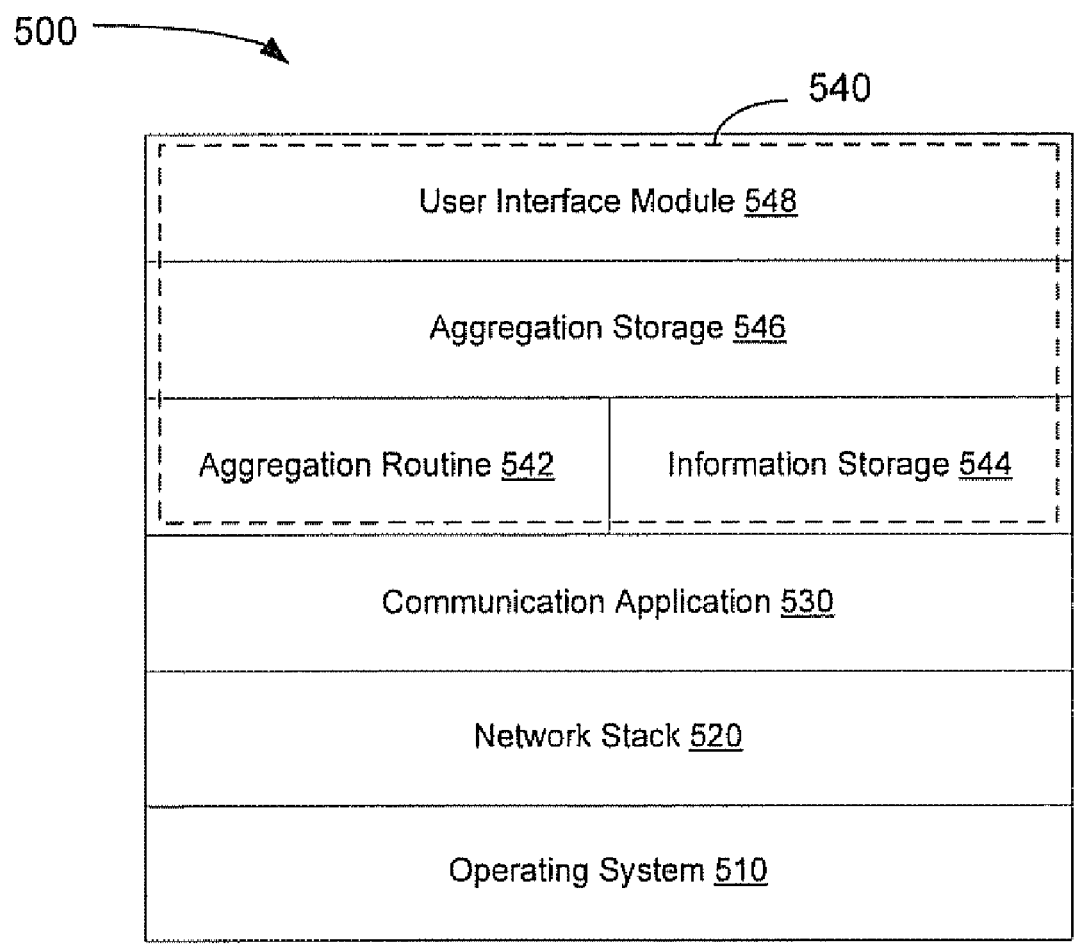
FIG. 5 is a diagrammatic representation of an embodiment of a software configuration of a point of contact console that facilitates account policy information aggregation for settling accounts in accordance with embodiments disclosed herein.

FIG. 5 is a diagrammatic representation of an embodiment of a software configuration 500 of point of contact console 232 depicted in FIGS. 2 and 3 that facilitates document aggregation for settling accounts in accordance with embodiments disclosed herein. Configuration 500 includes an operating system 510 that manages execution of a network stack 520 that provides for network communications in addition to the general management of hardware and software resources of console 232. Network stack 520 may be implemented as a transmission control protocol/Internet protocol (TCP/IP) stack. A communication application 530 may be deployed and run on network stack 520 that facilitates transmission of information from client 232 to one or more of servers 210a-210n and receipt of information therefrom. Communication application 530 may comprise, for example, a browser or other communication application adapted for transmitting and receiving data via network 250. An aggregation application 540 may run on or within communication application 530. For example, aggregation application 540 may interface with, or alternatively include, communication application 530. In other implementations, aggregation application 540 may comprise an applet executed by communication application 530, a plug-in to communication application 530, or another application with a suitable interface for obtaining account information from a point of contact personnel and that is adapted to query databases 230a-230n, for example by conveying requests to respective servers 210a-210n over network 250.

Aggregation application 540 may include an aggregation routine 542 that is adapted to aggregate content from a plurality of document definitions into a single aggregate document that may be submitted to a beneficiary for account settlement. To facilitate aggregation of multiple documents, aggregation routine 542 may include, or otherwise interface with, information storage 544 to which aggregation routine 542 may temporarily store document and decedent information received by aggregation application 540. Information storage 544 may comprise, for example, a local address space, e.g., a range of main memory 306 of console 232, allocated to aggregation application 540. Aggregation application 540 may additionally comprise an aggregation storage 546, such as a local memory space, to which aggregation application 540 may write content of policy documents in a manner that facilitates document aggregation in accordance with embodiments disclosed herein. Additionally, aggregation application 540 may comprise a user interface module 548 that provides a user interface, such as a graphical user interface or a command line interface, for receiving input from the point of contact personnel and providing output thereto.

FIG. 5 is intended as an example, and not as an architectural limitation, of a software configuration in which embodiments disclosed herein may be implemented. The particular software configuration shown and described is illustrative and is chosen only to facilitate an understanding of the disclosed embodiments.

In accordance with an embodiment, each of databases 230a-230n may store one or more document definitions that each respectively define a document required for settling a member account. Additionally, each of databases 230a-230n may store a table(s), or other data structure(s), that maps or otherwise associates a member with one or more policy identifiers that specify a policy held by the member. The data structure that maps a member to one or more policy identifiers may additionally hold data that defines or otherwise specifies the benefit, i.e., the compensation, of the member's policy. In other implementations, other data structures may be maintained in databases 230a-230n that maintain policy benefit amounts.

In one implementation, a document definition may be defined as a collection of one or more information sets and/or one or more information request sets (collectively referred to herein simply as sets). An information set (IS), as referred to herein, comprises a set or section of data that defines, at least in part, content of a policy document that is to be reviewed by a beneficiary for account settlement purposes. An information request set (IRS), as referred to herein, comprises a set or section of data that defines, at least in part, content of a policy document that specifies a request or solicitation for information from a beneficiary for account settlement purposes. For example, a portion of a policy settlement document that sets forth a request for identifying information, such as a social security number, of a beneficiary may comprise an information request set, or a portion thereof. A document definition may be identified as associated with a particular member, and the information sets and information request sets that conjunctively define the identified document definition may then be retrieved from the respective database 230a-230n.

In accordance with an embodiment, each information set and information request set may have an identifier associated therewith. The identifier may comprise, for example, an alphabetic, alpha-numeric, numeric, or other character string. When a set is retrieved from one of databases 230a-230n, the identifier may be retrieved with the set. The set and associated identifier may then be conveyed to POC console 232 and temporarily stored thereby, e.g., in information storage 544, to facilitate policy document aggregation in accordance with embodiments disclosed herein.

Various document definitions may share one or more information sets or information request sets with other document definitions. Sets that are shared between a plurality of document definitions are referred to herein as common or repetitive sets. In a preferred embodiment, sets that are common to multiple document definitions share an identifier. Aggregation application 540 may then identify common sets that have common content when aggregating a plurality of document definitions into a single aggregate document. In this manner, information that is required to be reviewed by a beneficiary is not repetitively provided to the beneficiary for settlement of multiple accounts. In a similar manner, information that is required to be provided by a beneficiary is not solicited from the beneficiary multiple times for the settlement of multiple accounts. Thus, the burden of account settlement is advantageously reduced when a person is designated as the beneficiary of multiple accounts.

Figure 6A:
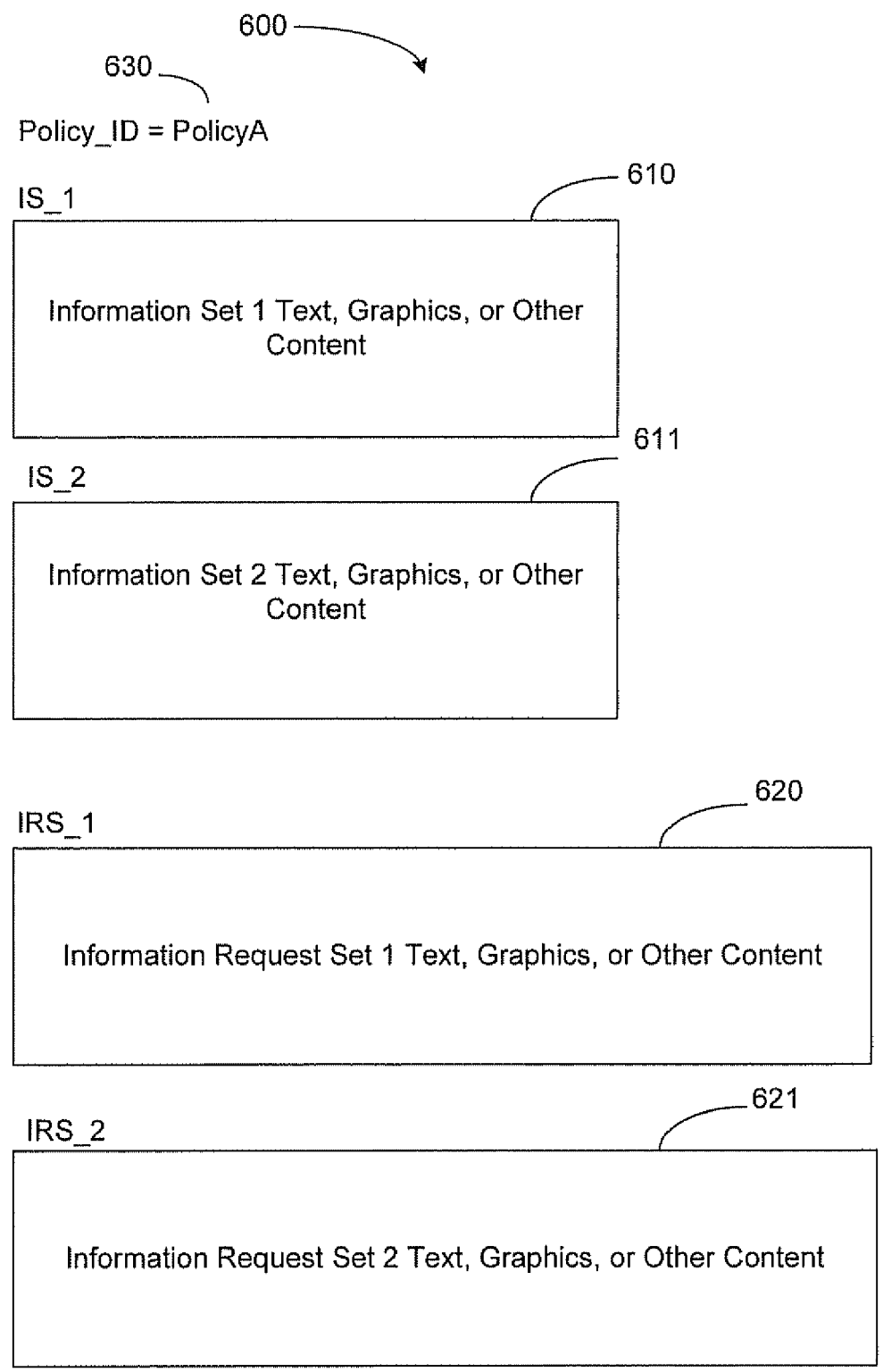
FIG. 6A is a diagrammatic representation of a document definition that facilitates document aggregation in accordance with an embodiment.

FIG. 6A is a diagrammatic representation of a document definition 600 that facilitates document aggregation in accordance with an embodiment. In the illustrative example, document definition 600 comprises two information sets 610 and 611, and two information request sets 620 and 621. Information sets and information request sets may have an identifier assigned thereto. In the illustrative example, information sets 610 and 611 have respective identifiers of IS_1 and IS_2, and information request sets 620 and 621 have identifiers of IRS_1 and IRS_2. The identifiers may comprise labels, file names, attribute values, or other indicia.

Information sets 610 and 611 respectively comprise textual, graphical, or other content of a policy document defined by document definition 600. Content of information sets 610 and 611 comprises data that is to be reviewed by a beneficiary to settle an account. For example, information sets 610 and 611 may set forth condolence messages, characteristics of the policy, procedures that are to be followed for account settlement, or other information related to the policy. Information request sets 620 and 621 may comprise textual, graphical, or other content of the policy defined by document definition 600 that sets forth a request for information from the policy beneficiary. For example, information request sets 620 and 621 may comprise fields that are to be filled in with the beneficiary's name, address, social security number, or other information relevant to settlement of the policy.

As should be apparent, numerous policies provided by various agencies may require, for example, supply of the beneficiary's name, social security number, or other commonly required information for account settlement. Accordingly, an information request set may be common to a plurality of document definitions. Likewise, an information set may be common to a plurality of document definitions. Other information sets or information request sets may be unique to a particular policy, or may be shared by a limited number of policies. In accordance with an embodiment, aggregation application 540 may identify common sets, that is repetitive content, among a plurality of document definitions associated with, or applicable to, policies held by a decedent, and aggregation application 540 may then generate an aggregate policy document with a single instance of the repetitive content.

Figure 6B:
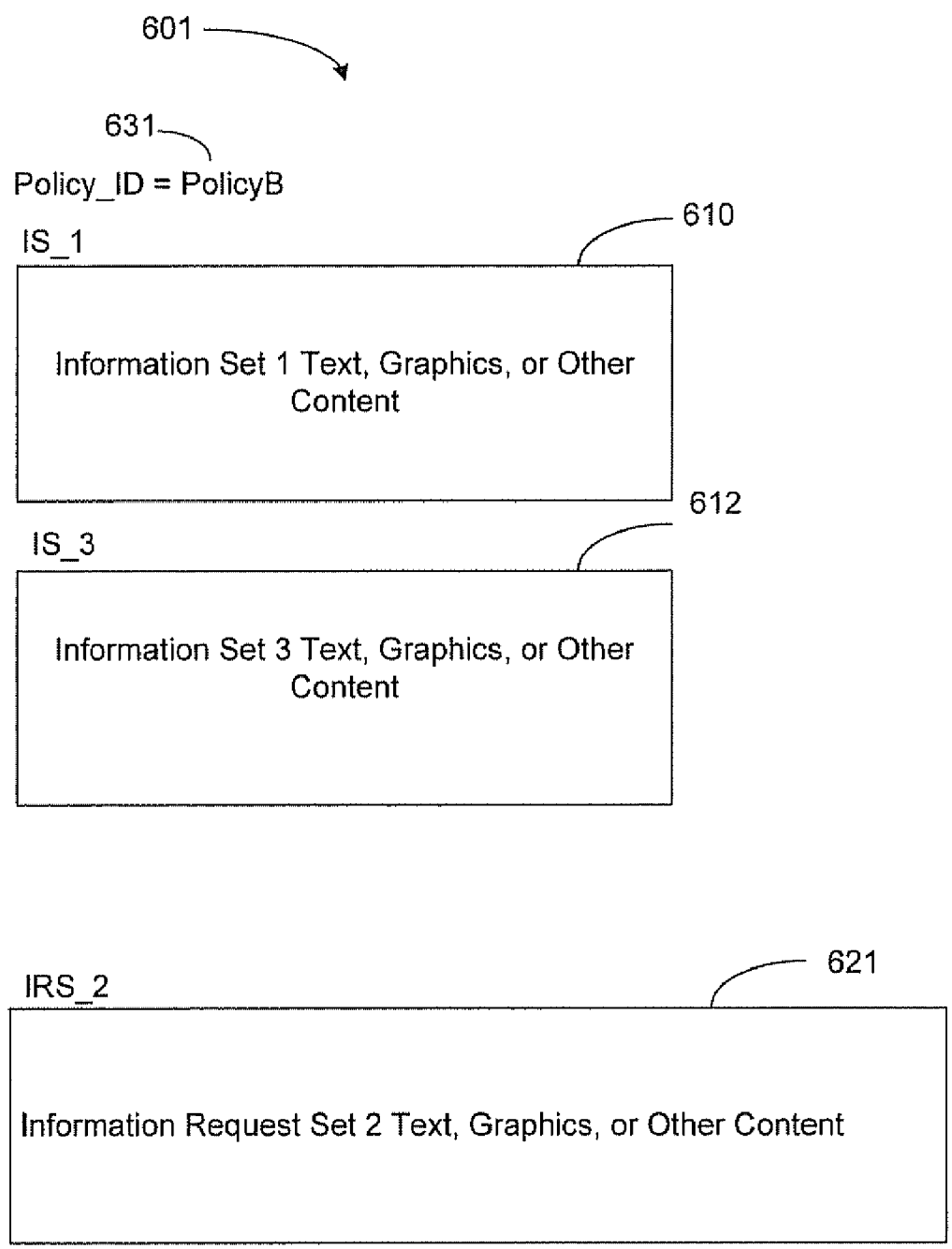
FIG. 6B is a diagrammatic representation of another document definition that facilitates document aggregation in accordance with an embodiment.

FIG. 6B is a diagrammatic representation of another document definition 601 that facilitates document aggregation in accordance with an embodiment. In the illustrative example, document definition 601 comprises two information sets 610 and 612 having identifiers of IS_1 and IS_3, and a single information request set 621 having an information request set identifier IRS_2. Information sets 610 and 612 respectively comprise textual, graphical, or other content of a document defined by document definition 601 that is to be reviewed by the beneficiary. Information request set 621 may comprise textual, graphical, or other content of the document defined by document definition 601 that sets forth a request for information from the policy beneficiary.

As can be seen, the documents defined by document definitions 600 and 601 include content that is common to both documents, such as information set 610 and information request set 621. In the particular example, the documents defined by document definitions 600 and 601 respectively include content that is not common to both documents. For example, the document defined by document definition 600 includes information set 611 that is not common to the document defined by document definition 601. Likewise, the document defined by document definition 601 includes information set 612 that is not common to the document defined by document definition 600. In accordance with embodiment disclosed herein, aggregation application 540 is adapted to obtain document definitions that define a plurality of documents to be supplied to a beneficiary, identify content that is common among the plurality of documents, and generate an aggregate document representative of the plurality of documents and that advantageously excludes repetition of content that is common among the plurality of documents.

FIG. 7A is a diagrammatic representation of a table 700 that associates members with policies that facilitates document aggregation in accordance with an embodiment. Table 700 comprises a plurality of records 720a-720m (collectively referred to as records 720) and fields 730a-730n (collectively referred to as fields 730) in which member and policy associations are defined. Table 700 may be stored on a disk drive or other suitable medium, fetched therefrom by a processor or other instruction processing device, and processed by a data processing system such as one or more of servers 210a-210n depicted in FIG. 2.

Fields 730 have a respective label, or identifier, that facilitates insertion, deletion, querying, or other data operations or manipulations of table 700. In the illustrative example, fields 730a-730n have respective labels of Member_ID, Member_Name, Policy1_ID, Policy2_ID, and PolicyX_ID. Each record 720a-720m defines one or more member-to-policy associations.

In the illustrative example, data elements stored in Member_ID field 730a comprise member identifiers (IDs) to which one or more policies are assigned. The Member_ID data element may, for example, comprise a social security number of a corresponding member. In the illustrative example, social security numbers of members for which records 720 define associated policies are illustratively designated SS_A-SS_M. Member_Name field 730b may maintain data elements, such as first, middle, and last names, of the member having an identifier in field 730a of a corresponding record 720. Policy_ID fields 730c-730n may maintain data elements that specify a particular policy assigned to a member of a corresponding record 720. Policy_ID fields 730c-730n may each respectively include a policy identity (ID) of a policy in which the member identified in the corresponding record is enrolled. For example, Policy_ID fields 730c-730n of record 720a indicate that the member having a member ID of "SS_A" is enrolled in policies having policy IDs of "PolicyA," "PolicyB," and "PolicyC." One or more of Policy_ID fields 730c-730n may be nulled in the event that the member does not have a corresponding policy allocated thereto. For example, the member for which record 720c is allocated only has a policy with a policy identifier of PolicyB assigned thereto. Accordingly, only a single field, field 730c in the illustrative example, of Policy_ID fields 730c-730n is required to include a policy identifier. Accordingly, fields 730d-730n are nulled in record 720c.

FIG. 7B is a diagrammatic representation of a table 750 that associates member policies with beneficiary identifiers and benefits in accordance with an embodiment. Table 750 comprises a plurality of records 770a-770e (collectively referred to as records 750) and fields 780a-780h (collectively referred to as fields 780) in which policy beneficiaries and benefits are defined. Table 750 may be stored on a disk drive or other suitable medium, fetched therefrom by a processor or other instruction processing device, and processed by a data processing system such as one or more of servers 210a-210n depicted in FIG. 2.

Fields 780 have a respective label, or identifier, that facilitates insertion, deletion, querying, or other data operations or manipulations of table 750. In the illustrative example, fields 780a-780h have respective labels of Member_ID, Member_Name, Address, Policy_ID, Account_No, Beneficiary, Benef_Addr, and Benefit. Each record 770a-770e defines one or more member policy-to-beneficiary and benefit associations.

In the illustrative example, data elements stored in Member_ID field 780a and Member_Name field 780b respectively comprise member identifiers to which one or more policies are assigned and the member name in a manner similar to fields 730a and 730b depicted in FIG. 7A. Address field 780c may store a data element that specifies the address of the member specified in Member_ID field 780a. Policy_ID field 780d may maintain data elements that specify a particular policy assigned to a member of a corresponding record 770. For example, Policy_ID field 780d of record 770a includes an identifier of a policy designated "PolicyA" assigned to the member having a member ID of SS_A specified in field 780a. Account_No field 780e may have a data element that specifies the account number of the policy specified in field 780d that is assigned to the member of the corresponding record. Beneficiary field 780f may store data elements that specify a beneficiary designated by the member identified in field 780a for the policy identified in field 780d of a particular record 770, and Benef_Addr field 780g may store a data element that specifies the address of a beneficiary identified in Beneficiary field 780f of a corresponding record. Benefit field 780h may store a data element that specifies a policy benefit amount of the policy specified in field 780d. In one implementation, data elements of Benefit field 780h may comprise signed floating point values where the sign of the data element indicates whether the benefit comprises a debit or credit. For example, if a policy identified in Policy_ID field 780d comprises a credit card account, the value of Benefit field 780h may comprises a negative floating point value indicating the debt amount accrued on the credit card (assuming the decedent had an outstanding debit amount at the time of death). In a similar manner, if a policy identified in Policy_ID field 780d comprises a life insurance policy, the value of Benefit field 780h may comprise a positive floating point value indicating the life insurance benefit amount. In this manner, table 750 may be used to store benefit amounts for both outstanding credit and debit balances.

In the particular implementation depicted in FIG. 7B, a policy holder or member will have a record 780 for each policy held by the member. For example, as indicted in FIG. 7A, the member having member identifier SS_A has three policies as indicated by fields 730c-730n. Accordingly, three corresponding records 770a-770c are allocated in table 750 to define the policy beneficiary and benefit of each of the policies held by the particular member.

An instance of member-to-policy association table 700 and policy-to-beneficiary table 750 may be maintained as member-to-policy mappings 250a-260n. In this implementation, an instance of tables 700 and 750 stores member-to-policy mappings and policy-to-beneficiary and benefit mappings for policies issued by the associated agency. For example, an instance of table 700 and 750 stored as member-to-policy mappings 260a may store member-to-policy mappings and policy-to-beneficiary and benefit mappings of policies issued to members of savings bank agency 110a.

Returning again to FIGS. 6A and 6B, policy IDs may be maintained in association with document definitions. In the illustrative example, document definitions 600 and 601 are each associated with a respective policy ID 630 and 631 of "PolicyA" and "PolicyB." In this implementation, identification of a policy ID of a policy issued to a member allows for retrieval of relevant document definitions from document definitions storage 270a-270n. Policy IDs of policies issued to a decedent may be obtained by interrogating table 700 with a member identifier of the decedent and reading fields 730c-730n of a record having the member ID in field 730a.

Figure 8:
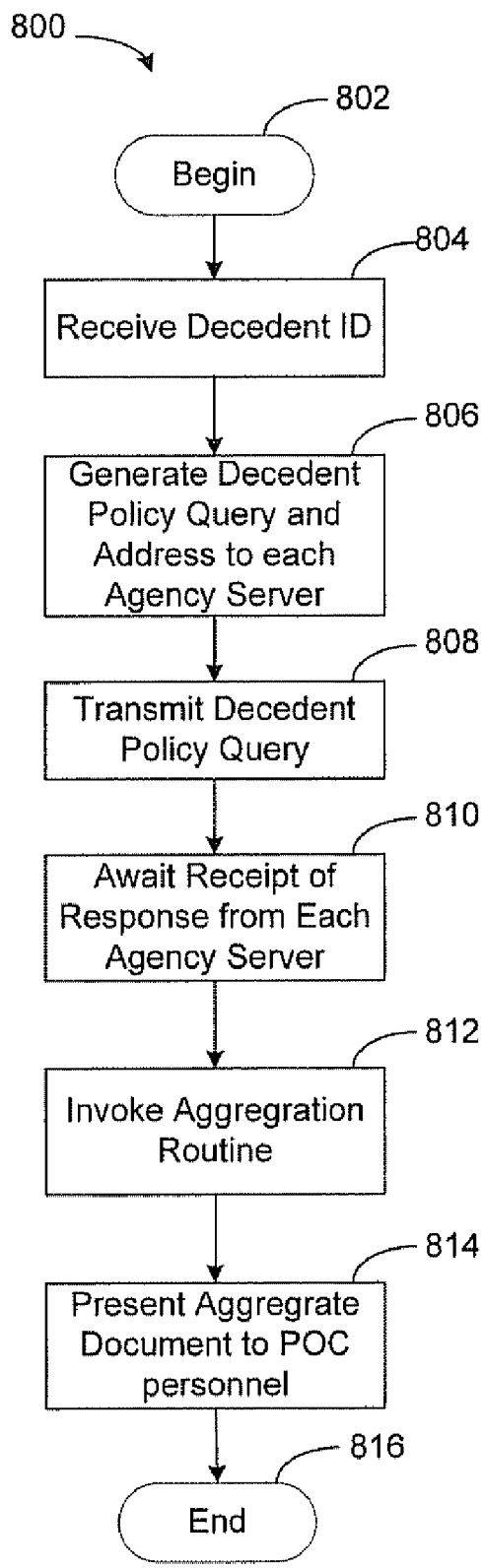
FIG. 8 is a flowchart that depicts processing of an embodiment of an aggregation application for receiving document definitions applicable to policies held by a specified decedent that facilitates document aggregation.

FIG. 8 is a flowchart 800 that depicts processing of an embodiment of aggregation application 540 for receiving document definitions of policies held by a specified decedent that facilitates document aggregation for settling accounts.

Aggregation application 540 is invoked (step 802), for example upon supply of a suitable command by a POC personnel at console 232 depicted in FIGS. 2 and 3. Aggregation application 540 may provide a prompt for entry of a decedent identifier, such as a decedent social security number, and await receipt of supply of the decedent identifier by the POC. On receipt of the decedent identifier (step 804), aggregation application 540 may generate a decedent policy query that includes the supplied decedent identifier (step 806). In one implementation, the decedent policy query may be formulated as one or more IP packets for transmission in system 200 depicted in FIG. 2. Once the decedent policy query is generated, aggregation application 540 may transmit the query to one or more agency servers (step 808), such as servers 210a-210n depicted in FIG. 2, and then awaits a reply from each queried server (step 810). Each server 210a-210n receiving the decedent query may then interrogate a respective database interfaced therewith, such as databases 230a-230n depicted in FIG. 2, to determine whether the decedent has any policies with the respective agency. If the server determines the decedent is a member of a policy issued by the agency, member, policy, and beneficiary information may be returned to console 232 along with any document definitions associated with the member's policies.

In one implementation, document definitions stored in databases 230a-230n are maintained as respective collections of one or more information sets and information request sets each having a respective identifier. Preferably, on determining that a document definition is applicable to a decedent, each information set and information request set of the applicable policy are retrieved from the respective database along with the associated information set or information request set identifier. In this manner, each information set and corresponding information set identifier, and each information request set and information request set identifier, are returned to console 232. Console 232 may store each received document definition including the information set(s) and information request set(s) thereof with the respective set identifier in a temporary storage, such as information storage 544. In the event that a server 210a-210n queries its associated database 230a-230n and no policy is identified as assigned to the decedent, an empty set or other indication that no policy is maintained by the particular agency for the specified decedent may be conveyed to console 232.

Once a reply has been received by aggregation application 540 from each queried server, aggregation application 540 may then invoke an aggregation routine (step 812) that aggregates the received document definition(s) into a single aggregate policy document as described more fully hereinbelow with reference to FIG. 10. In particular, the aggregation application aggregates the document definitions in a manner that repetitive content shared among a plurality of document definitions is included as a single instance of content in the aggregate document. On completion of the processing by the aggregation routine, aggregation application 540 may present the aggregate policy document to the POC personnel (step 814). In other implementations, the aggregate policy may be stored, printed, or subject to other processing in conjunction with, or in lieu of, presentation of the aggregate policy document to the POC. The aggregation application processing routine cycle may then end (step 816).

Figure 9:
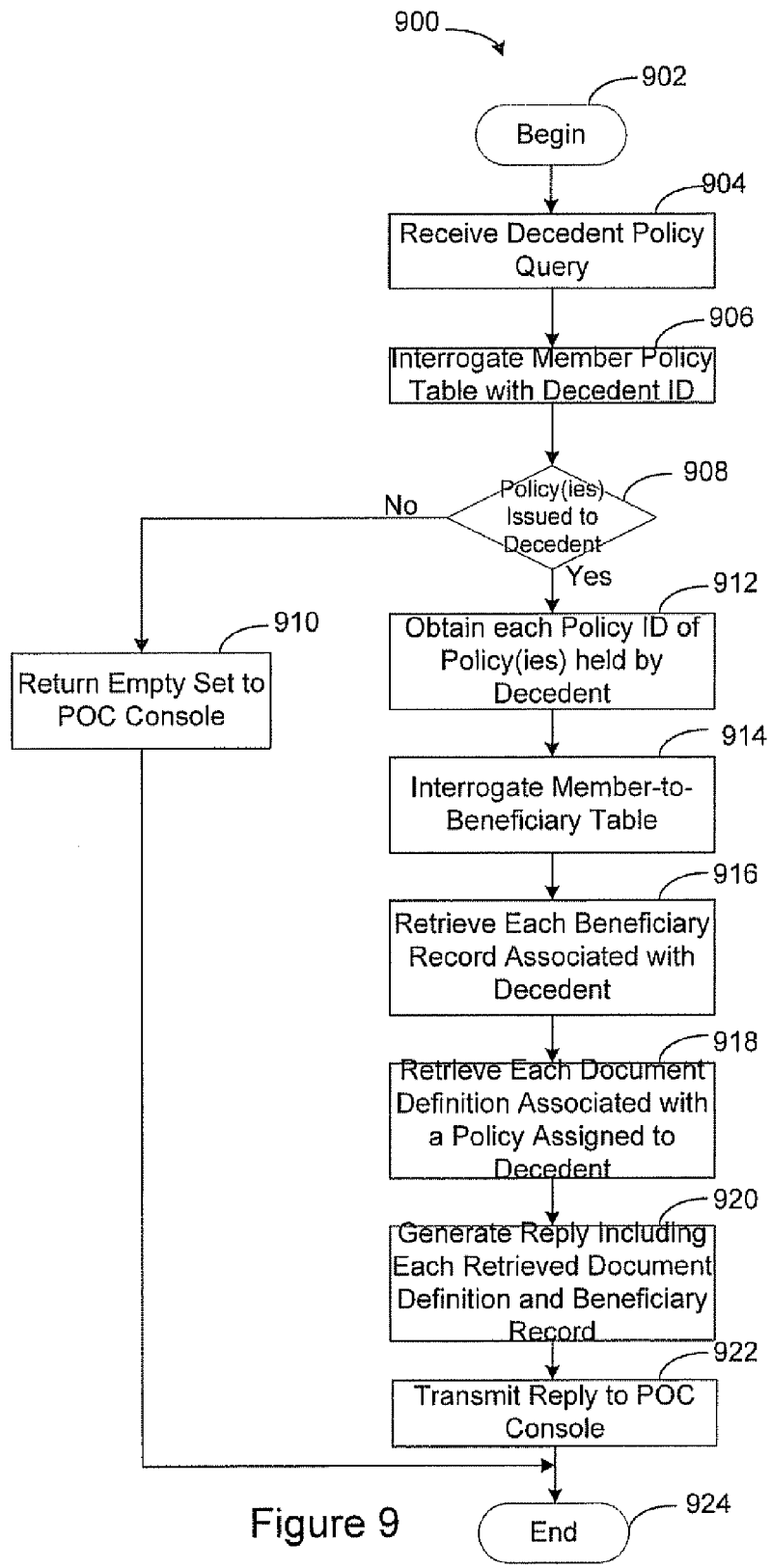
FIG. 9 is a flowchart that depicts an embodiment of processing of an agency server that facilitates document aggregation.

FIG. 9 is a flowchart 900 that depicts an embodiment of processing of an agency server that facilitates policy document aggregation for settling accounts. The agency server processing routine may be invoked (step 902), and the processing routine may await receipt of a decedent policy query issued by POC console 232 (step 904). Upon receipt of a decedent policy query, the server processing routine may interrogate the servers member-to-policy table with the decedent ID included in the decedent policy query (step 906). An evaluation may then be made to determine if the agency has a policy issued to the decedent (step 908). If it is determined that the agency has no policies issued to the decedent, the server processing routine may proceed to return an empty set or other suitable indication that the agency has no policies issued to the decedent to the POC console that issued the decedent policy query (step 910), and the agency server processing routine cycle may then end (step 924).

Returning again to step 908, in the event that it is determined that the agency has one or more policies issued to the decedent, the agency server processing routine may obtain a policy ID of each policy issued to the decedent (step 912). The agency server processing routine may then interrogate the agency's member-to-beneficiary table (step 914), e.g., table 750, and obtain each beneficiary record for each policy assigned to the decedent therefrom (step 916). The agency server processing routine may then obtain each document definition associated with a policy held by the decedent with the agency (step 918), e.g., by interrogating the server's document definitions storage 270 with the policy IDs of policies held by the decedent. The agency server processing routine may then proceed to generate a query reply that includes each retrieved document definition and beneficiary record associated with the decedent (step 920), and the query reply may then be transmitted to the POC console that issued the decedent policy query (step 922). The processing routine cycle may then end according to step 924.

Figure 10:
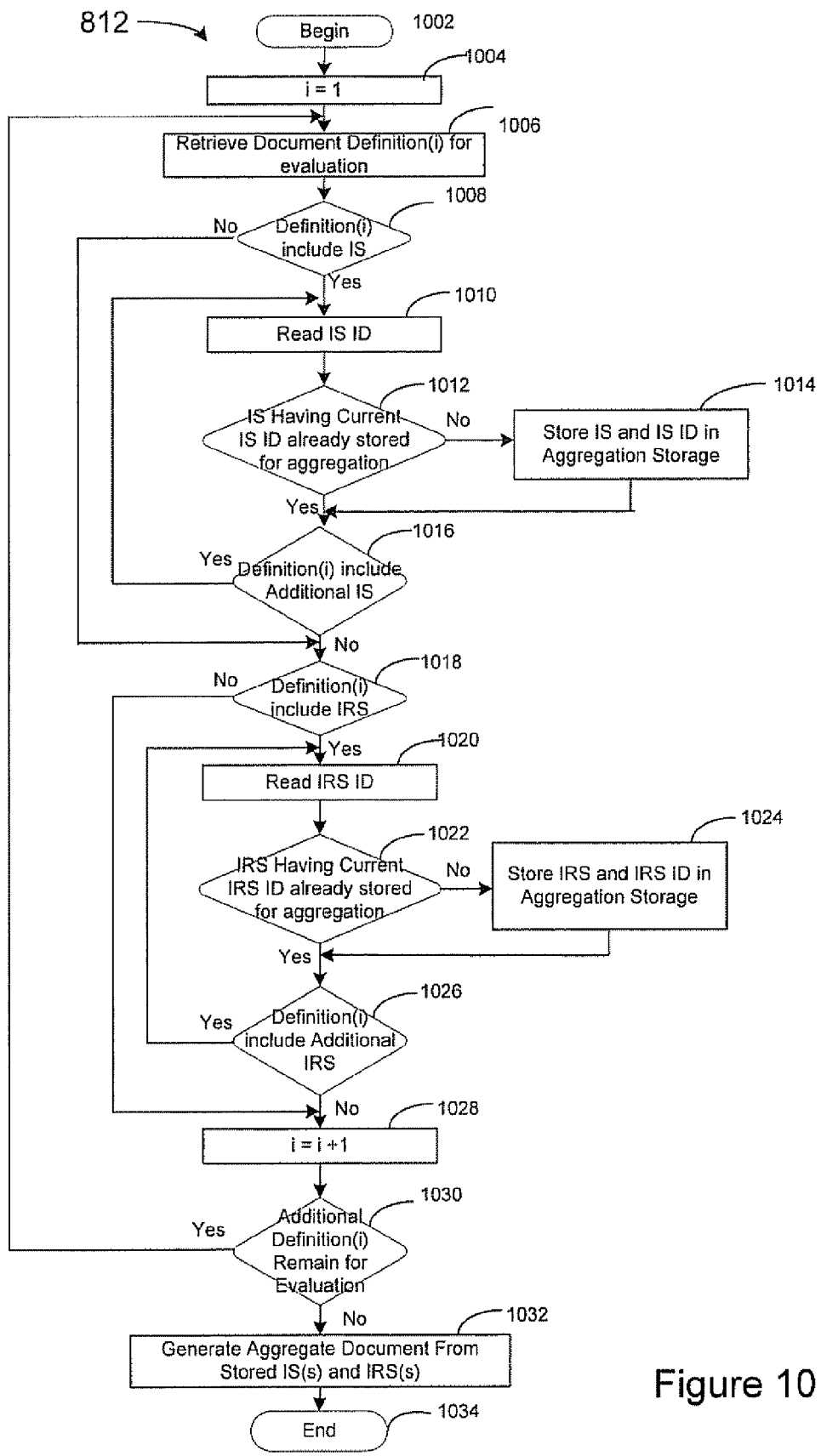
FIG. 10 is a flowchart that depicts an embodiment of processing of an aggregation routine for aggregating multiple documents defined by multiple document definitions into a single aggregate document.

FIG. 10 is a flowchart that depicts an embodiment of processing of aggregation routine 542 of aggregation application 540 for aggregating multiple document definitions into a single aggregate document. The processing steps of FIG. 10 correspond to the processing step 812 depicted in FIG. 8.

The aggregation routine is invoked (step 1002), and the aggregation routine may initialize a counter variable i (step 1004). A document definition(i) that has been received and temporarily stored by aggregation application 540 in information storage 544 is then retrieved (step 1006). Retrieval of document definition(i) preferably includes retrieval of each IS and IRS of the document definition and IS ID(s) and IRS ID(s) of the retrieved ISs and IRSs. An evaluation may then be made to determine if the retrieved document definition(i) includes an IS (step 1008). In the event that the retrieved document definition does not include an IS, aggregation routine 542 may proceed to evaluate whether the retrieved document definition(i) includes an IRS (step 1018). In the event that the retrieved document definition(i) does include an IS, the IS ID of the IS is read (step 1010), and the aggregation routine may then evaluate whether the IS having the currently read IS ID has already been stored in aggregation storage 546 for aggregation (step 1012). In the event that the currently read IS has not be stored for aggregation, the currently read IS and its IS ID may be stored in aggregation storage 546 (step 1014), and aggregation routine 542 may then proceed to evaluate whether document definition(i) includes an additional IS (step 1016). Returning again to step 1012, in the event that the IS having the currently read IS ID has already been stored for aggregation, aggregation routine 542 may optionally delete the currently evaluated IS and IS ID from information storage 544 and may then proceed to determine whether the document definition(i) includes an additional IS according to step 1016. If an additional IS is included in the document definition(i), aggregation routine 542 may return to step 1010 to read the IS ID of the next IS included in document definition(i).

When a determination is made that the document definition (i) does not include any additional ISs at step 1016, aggregation routine 542 may proceed to evaluate whether document definition(i) includes an IRS (step 1018). In the event that document definition(i) does not include an IRS, the aggregation routine may proceed to increment the counter variable i (step 1028).

Returning again to step 1018, if document definition(i) is determined to include an IRS, the aggregation routine may proceed to read the IRS ID of an IRS of document definition (i) (step 1020), and may then evaluate whether the IRS having the currently read IRS ID has previously been stored in aggregation storage 546 (step 1022). In the event that an IRS having the currently read IRS ID has not been previously stored in aggregation storage 546, aggregation routine 542 may store the IRS and optionally its IRS ID in aggregation storage 546 (step 1024) and optionally delete the IRS from information storage 544. Aggregation routine 542 may then evaluate whether document definition(i) includes an additional IRS (step 1026).

Returning again to step 1022, if it is determined that an IRS having the currently read IRS ID has previously been stored in aggregation storage 546, aggregation routine 542 may proceed to evaluate whether the document definition(i) includes an additional IRS according to step 1026. If an additional IRS is included in document definition(i), aggregation routine 542 may return to step 1020 to read the IRS ID of the next IRS included in document definition(i).

When a determination is made at step 1026 that no additional IRSs remain in document definition(i), aggregation routine 542 may proceed to increment the counter i (step 1028) and may then evaluate whether an additional document definition remains for evaluation (step 1030). If an additional document definition(i) remains for evaluation, aggregation routine 542 may return to step 1006 to retrieve the document definition(i) for evaluation. When a determination is made that no additional document definitions remain at step 1030, aggregation routine 542 may proceed to generate an aggregate document from any ISs and IRSs stored in aggregation storage 546 (step 1032). For example, aggregation application 540 may sequentially append ISs and IRSs stored in aggregation storage 546 to a single file data structure. In other implementations, aggregate document formatting may be providing by including logic in aggregate application 540 to apply document formatting dependent on a particular IS or IRS to enhance the aesthetic appeal of the aggregate document. The aggregation routine cycle may then end (step 1034).

Figure 11:
FIG. 11 depicts a document definition that defines a document in a manner that facilitates document aggregation in accordance with embodiments disclosed herein.

Implementations of embodiments disclosed herein may be better understood with reference now to FIGS. 11-13. FIG. 11 depicts a document that may be stored as a document definition 1100 in a manner that facilitates document aggregation in accordance with embodiments disclosed herein. Document definition 1100 defines a document that may be provided by savings bank 110*a* depicted in FIGS. 1 and 2 to a beneficiary of a decedent. In the particular example, document definition 1100 defines a credit card account settlement document. Document definition 1100 includes various information sets 1110-1117. Each information set has a respective IS ID 1120-1127 (illustratively designated with labels of IS_1-IS_7).

FIG. 12 depicts a document that may be stored as a document definition 1200 in a manner that facilitates document aggregation in accordance with embodiments disclosed herein. Document definition 1200 defines a document that may be provided by savings bank 110*a* depicted in FIGS. 1 and 2 to a beneficiary of a decedent. In the particular example, document definition 1200 defines an account settlement document. Document definition 1200 includes various information sets 1210-1215 and an information request set 1230. Each information set 1210-1215 has a respective IS ID 1220-1225, and information request set 1230 has an information request set identifier 1240. In the particular example, IS IDs 1220-1225 each have a respective label of IS_1, IS_3, IS_4, IS_9, IS_8, and IS_10, and IRS ID 1240 has a label of IRS_1.

Notably, IS 1110 of document definition 1100 depicted in FIG. 11 is identical in content to IS 1210 of document definition 1200 depicted in FIG. 12. Accordingly, both IS 1110 and IS 1210 share a common IS ID of "IS_1". In a similar manner, IS 1112 in document definition 1100 is identical in content to IS 1211 in document definition 1200 and both IS 1112 and IS 1211 share a common IS ID of "IS_3". Likewise, IS 1113 of document definition 1100 and IS 1212 of document definition 1200 are identical in content and share a common IS ID of "IS_4", and IS 1117 and IS 1214 are identical in content and share a common IS ID of "IS_8".

For illustrative purposes, assume document definitions 1100 and 1200 are stored in document definitions storage 270*a*. Further assume a decedent has one or more accounts with which documents defined by document definitions 1100 and 1200 are required to be provided to the decedent's beneficiary for settling of the account(s). In accordance with an embodiment, POC personnel 132 may generate a decedent query at console 232 that includes an identifier, such as a name or social security number of the decedent. The decedent query may then be transmitted from console 232 to each of servers 210*a*-210*n* that, in turn, query member-to-policy mappings 260*a*-260*n*. If the decedent has a policy with a particular agency, the DBMS may locate the policy identities, identify document definitions that are applicable to the policies, and fetch the applicable document definitions from the document definitions storage. In the present example, assume that the decedent only has policies with savings bank agency 110*a*. In this instance, server 110*a* obtains document definitions 1100 and 1200 from document definitions storage 270*a* and may also obtain policy beneficiary information, such as one or more records of tables 700 and/or 750 maintained by database 230*a* relevant to the decedent accounts. Server 210*a* may then transmit document definitions 1100 and 1200 and associated beneficiary information to console 232 where the received information is stored in information storage 544. Other servers 210*b*-210*n* may return an empty set or other indication to console 232 that indicates no policies are held by the decedent at the respective agencies 110*b*-110*n*.

When a response has been obtained by each of the queried servers, console 232 may invoke aggregation routine 542 that begins reading an information set and corresponding IS ID from information storage 544. In each instance that aggregation routine 542 encounters an IS ID that has not previously been read during the aggregation process, the information set corresponding to the IS ID may be written to aggregation storage 546. The IS ID of an information set may optionally be stored in aggregation storage 546 in association with the information set. In the event that aggregation routine 542 reads an IS ID that has previously been encountered in the aggregation cycle (thus indicating that the corresponding information set is already stored in aggregation storage 546), the aggregation routine 542 may discard that instance of the IS and IS ID. Thus, only a single instance of an IS will be written to aggregation storage 546 regardless of how many document definitions that include a particular IS have been stored in information storage 544. In a similar manner, information request set IDs are evaluated to determine if a particular information request set fetched from information storage 544 has previously been stored in aggregation storage 546. Thus, only a single instance of an IRS will be written to aggregation storage 546. When all ISs and IRSs of each document definition received by aggregation application 540 and stored to information storage 544 have been evaluated, aggregation application 540 may then generate an aggregate document from the ISs and IRSs stored in aggregation storage 546.

FIGS. 13A and 136 depict an aggregate document 1300 generated from aggregation of documents defined by document definitions 1100 and 1200 in accordance with an embodiment. Aggregate document 1300 may be generated by sequentially appending into a file information sets and information request sets from aggregation storage 546 after all received document definitions (document definitions 1100 and 1200 in the present example) have been evaluated. As can be seen, aggregate document 1300 includes the content of each of ISs 1110-1117 of document definition 1100, each of ISs 1210-1215 of document definition 1200, and IRS 1230 of document definition 1200. However, repetitive content, such as content of ISs 1110, 1112, 1113, and 1117 of document definition 1100 that is common with content of ISs 1210, 1211, 1212, and 1214 of document definition 1200, is not repetitively included in aggregate document 1300 but, rather, is only included a single instance. Advantageously, aggregate document 1300 provides for more efficient review of information and supply of required information by a beneficiary to settle accounts of a decedent. Accordingly, the burden of settling accounts by a survivor or beneficiary is greatly simplified.

The examples provided herein describe embodiments of document aggregation for a death event for illustrative purposes, and implementation of the embodiments is not limited to such an application. For example, embodiments disclosed herein may be implemented to facilitate account settlement in a divorce proceeding, a mortgage closing, or various other scenarios that require review of various documents that may include common content by a person and/or supply of information that may be common to various documents. The particular examples described herein are for illustrative purposes only and are provided to facilitate an understanding of the described embodiments.

While the depicted examples of FIGS. 11-13 show aggregation of documents obtained from a single agency, document definitions maintained by various agencies in system 200 may be coordinated such that content common among various document definitions share a common ID, such as an information set ID or a information request set ID. Thus, the document aggregation mechanisms described herein may be applied system-wide across any number of agencies that wish to collaborate in account settlement.

The flowcharts of FIGS. 8-10 depict process serialization to facilitate an understanding of disclosed embodiments and are not necessarily indicative of the serialization of the operations being performed. In various embodiments, the processing steps described in FIGS. 8-10 may be performed in varying order, and one or more depicted steps may be performed in parallel with other steps. Additionally, execution of some processing steps of FIGS. 8-10 may be excluded without departing from embodiments disclosed herein. The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single computer processor or multiple computer processors. Additionally, various steps of embodiments of the invention may provide one or more data structures generated, produced, received, or otherwise implemented on a computer-readable medium, such as a memory.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for settling accounts, comprising:
retrieving, for each of a plurality of insurance policies associated with a decedent, information and an information identifier;
performing, via a computer processor, an aggregation routine, wherein the aggregation routine comprises:
reading, during the aggregation routine, a first identifier associated with first information related to a first insurance policy;
determining that a second identifier associated with second information related to a second insurance policy has previously been read during the aggregation routine and matches the first identifier; and discarding the first information in response to determining that the first identifier matches the second identifier; and
producing an aggregate insurance policy document that comprises the second information and is free of the first information; and wherein the information related to each of the plurality of insurance policies is automatically and electronically provided to a beneficiary and comprises content that is to be reviewed by a beneficiary to settle an account.

2. The method of claim 1, wherein the performing the aggregation routine further comprises:
reading, during the aggregation routine, the second identifier associated with the second information related to the second insurance policy;

determining that the second identifier does not match any identifier that has previously been read during the aggregation routine; and storing the second information in an aggregate storage in response to determining that the second identifier does not match any previously read identifiers.

3. The method of claim 2, wherein a plurality of information, each related to a respective insurance policy, is stored in the aggregate storage upon determining that a respective identifier associated with each of the plurality of information does not match any previously read identifiers.

4. The method of claim 3, further comprising:
determining no additional identifiers associated with each of the plurality of information are available for reading; and generating the aggregate insurance policy document from the information stored in the aggregation storage.

5. The method of claim 1, wherein the performing the aggregation routine further comprises:
reading, during the aggregation routine, the second identifier associated with a second information related to the second insurance policy;
determining that the second identifier does not match any identifiers that have been read during the aggregation routine; and appending the second information to the aggregate insurance policy document in response to determining that the second identifier does not match any previously read identifiers, wherein the aggregate insurance policy document is representative of a plurality of documents.

6. A non-transitory computer-readable medium comprising computer-readable instructions for settling an account, said computer readable instructions comprising instructions for: retrieving, for each of a plurality of policies associated with a decedent, information and an information identifier;
performing an aggregation routine, wherein the aggregation routine comprises;
reading, during the aggregation routine, a first identifier associated with first information related to a insurance first policy;
determining that a second identifier associated with second information related to a second insurance policy has previously been read during the aggregation routine and matches the first identifier;
discarding the first information in response to determining that the first identifier matches the second identifier;
producing an aggregate insurance policy document that comprises the second information and is free of the first information;
wherein the information related to each of the plurality of insurance policies is automatically and electronically provided to a beneficiary and comprises content that is to be reviewed by a beneficiary to settle an account; and wherein the information related to the plurality of insurance policies comprises an information request specifying a solicitation for information from a beneficiary to settle an account.

7. The computer-readable instructions of claim 6, wherein the instructions for performing the aggregation routine further comprise instructions for:
reading, during the aggregation routine, the second identifier associated with the second information related to the second insurance policy;
determining that the second identifier does not match any identifier that has been previously been read during the aggregation routine; and
storing the second information in an aggregate storage in response to determining that the second identifier does not match any previously read identifiers.

8. The computer-readable instructions of claim 7, wherein a plurality of information, each related to a respective insurance policy, is stored in the aggregate storage upon determining that a respective identifier associated with each of the plurality of information does not match any previously read identifiers.

9. The computer-readable instructions of claim 8, further comprising instructions for:
determining no additional identifiers associated with each of the plurality of information are available for reading; and generating the aggregate insurance policy document from the information stored in the aggregation storage.

10. The computer-readable instructions of claim 6, wherein the instructions for performing the aggregation routine further comprise instructions for:
reading, during the aggregation routine, the second identifier associated with a second information related to the second insurance policy;
determining that the second identifier does not match any identifiers that have been read during the aggregation routine; and
appending the second information to the aggregate insurance policy document in response to determining that the second identifier does not match any previously read identifiers, wherein the aggregate policy document is representative of a plurality of documents.

11. A system for settling an account, said system comprising a computer processor and memory coupled to the processor having stored thereon:
at least one subsystem that retrieves, for each of a plurality of policies associated with a decedent, information and an information identifier;
at least one subsystem that performs an aggregation routine, wherein the at least one subsystem that performs the aggregation routine comprises:
at least one subsystem that reads, during the aggregation routine, a first identifier associated with first information related to a first insurance policy;
at least one subsystem that determines that a second identifier associated with the second information relate to a second insurance policy has previously been read during the aggregation routine and matches the first identifier;
at least one subsystem that discards the first information in response to determining that the first identifier matches the second identifier;
at least one subsystem that produces an aggregate policy document that comprises the second information and is free of the first information;
at least one subsystem wherein the information related to each of the plurality of insurance policies is automatically and electronically provided to a beneficiary and comprises content that is to be reviewed by a beneficiary to settle an account; and
wherein the information related to each of the plurality of insurance policies comprises an information request specifying a solicitation for information from a beneficiary to settle an account.

12. The system of claim 11, wherein the at least one subsystem that performs the aggregation routine further comprises:
at least one subsystem that reads, during the aggregation routine, the second identifier associated with the second information related to the second insurance policy;

at least one subsystem that determines that the second identifier does not match any identifier that has previously been read during the aggregation routine; and at least one subsystem that stores the second information in an aggregate storage in response to determining that the second identifier does not match any previously read identifiers.

13. The system of claim 12, wherein a plurality of information, each related to a respective insurance policy, is stored in the aggregate storage upon determining that a respective identifier associated with each of the plurality of information does not match any previously read identifiers.

14. The system of claim 13, further comprising:
   at least one subsystem that determines no additional identifiers associated with each of the plurality of information are available for reading; and
   at least one subsystem that generates the aggregate insurance policy document from information stored in the aggregation storage.

* * * * *